H. A. TUTTLE.
BAND BRAKE.
APPLICATION FILED JUNE 9, 1911.
1,051,928.
Patented Feb. 4, 1913.
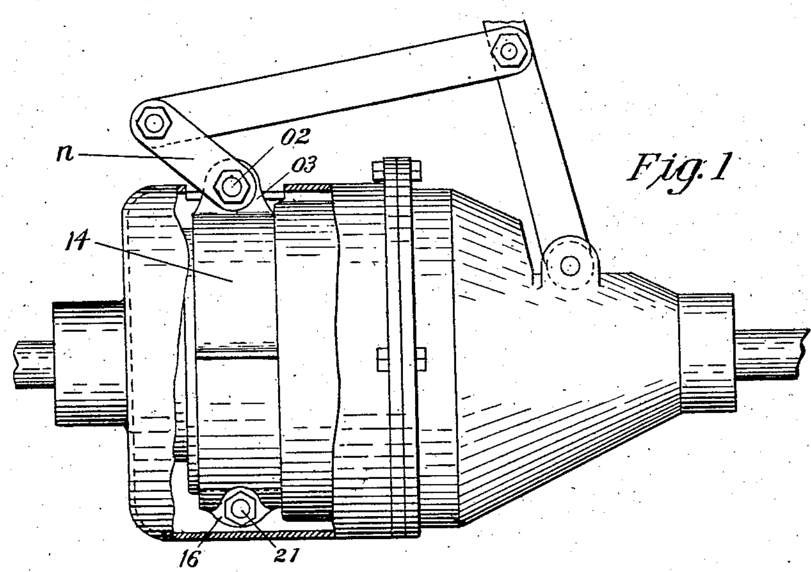
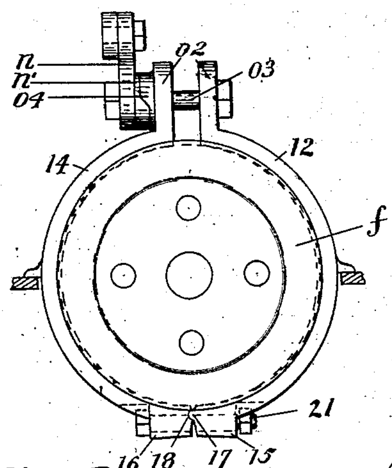
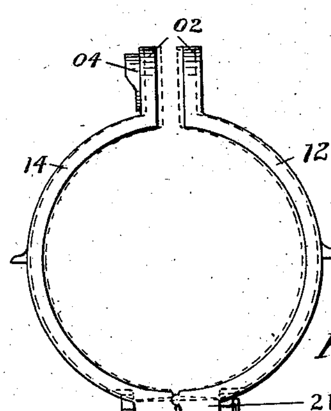
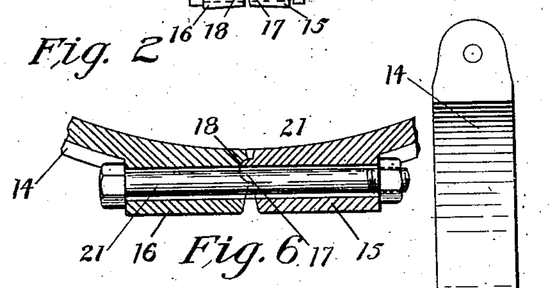
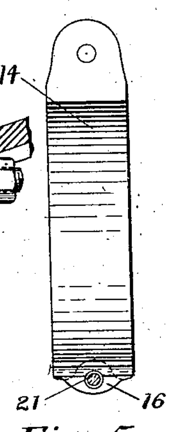
Fig. 4
14
18
16
Witnesses
H. B. Davis.
Cynthia Doyle
Inventor
Henry A. Tuttle
by Nayes & Harriman
Attys.

UNITED STATES PATENT OFFICE.

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

BAND-BRAKE.

1,051,928. Specification of Letters Patent. Patented Feb. 4, 1913.

Application filed June 9, 1911. Serial No. 632,135.

*To all whom it may concern:*

Be it known that I, HENRY A. TUTTLE, a citizen of the United States, residing at Taunton, in the county of Bristol and State of Massachusetts, have invented an Improvement in Band-Brakes, of which the following is a specification.

This invention relates to band-brakes, especially adapted for use in connection with transmission gearing, and is intended as an improvement upon the band-brake of Letters Patent #917,814, dated April 13, 1909. In said patent the band-brake is composed essentially of two semicircular, resilient members, rigidly connected together at their lower ends, and means to engage their upper ends which act to forcibly draw said upper ends toward each other and thereby bend said resilient members, to cause them to engage a cylindrical case or other object. The band-brake of said patent is especially adapted for use in connection with the reverse-gearing shown in Letters Patent #901,664, dated October 20, 1908. In order that the resilient members may frictionally engage the cylindrical case with the requisite degree of pressure, it is quite important to provide means to adjust the members with respect to each other whereby the degree of resiliency may be varied, and the object of this invention is to improve the construction of the band-brake whereby this result may be accomplished.

In accordance with my present invention the band-brake is composed of two semicircular resilient members having engaging faces at their lower ends, with coöperating pivotal supports, and adjustable means to loosely connect said members together at their lower ends, below said pivotal supports, which permit of the members being adjusted with respect to each other in order to vary the degree of resiliency of the said members.

The actuating-means for the band-brake which is connected with the upper ends of its members, and acts to move the said members toward and into engagement with the object and permits of movement of said members out of engagement with the object.

In said patent the means employed to connect together the lower ends of the members is utilized as a support for the actuating-lever, but such means requires considerable space below the brake-band, which is not always obtainable, and the means embodying this invention for connecting the lower ends of said members occupies but little space and therefore overcomes this objection.

Figure 1 is a front elevation of a band-brake embodying this invention. Fig. 2 is an end view of the band-brake shown in Fig. 1. Fig. 3 is an end view of the brake-members, the dotted lines representing the position they will occupy when in engagement with an object. Fig. 4 is a vertical section of one of the brake-members. Fig. 5 is a side view of one of the members. Fig. 6 is an enlarged sectional detail of the lower ends of the brake-mechanism.

*f* represents a cylindrical object which is adapted to be engaged by the brake-members.

12 and 14 represent two resilient semicircular brake-members shaped to embrace the object. The lower ends of the brake-members are in engagement with each other and each member has on its engaging-face a pivotal support, and said pivotal supports are adapted to engage each other, so that each member is pivotally supported on the other to permit of a rocking movement. As here shown, one of said members as 12 has a semicircular rib 17 extended transversely across its engaging-face, from side to side, and the other member, as 14, has a semi-circular recess 18 extended transversely across its engaging-face, from side to side, said recess receiving the aforesaid rib 17, and said rib and recess serve as pivotal supports for the members, to permit of a relative rocking movement thereof. As here shown, one of said members, as 12, has a boss 15 at its lower end, which is formed on its under side, intermediate its width, and the other member has a like boss 16 at its lower end, which is formed on its under side, intermediate its width. The adjacent lower ends of the members and of the bosses thereon are formed with inclined faces extending downwardly from the pivotal supports 17, 18, to the bottom of the bosses, and said adjacent ends are also formed with inclined faces extending upwardly from the pivotal supports to the top of said ends, thus to admit of the rocking movement of the members. A bolt 21 passes through holes bored lengthwise through said bosses 15 and 16, which holes aline with each other when the members are in engagement with each other. In order that a large bolt may be employed said holes may intersect the pivotal supports, but said pivotal supports are disposed above the center of the bolt. The holes are made of a diameter larger than the bolt, so that the bolt fits loosely, to permit of a rocking movement of the members. The nut on the bolt may be adjusted to determine the relative position of the members with respect to each other, thereby to vary their resiliency.

The upper ends of the semicircular members are connected with suitable actuating-means, and for purposes of illustration the actuating-means of Patent #917,814, is here employed, wherein a bolt $o^3$ extends through holes in the ears $o^2$, $o^2$, which is made long enough to extend beyond one of the ears, to receive upon it an arm $n$ between its head and the adjacent ear. The arm $n$ has a cam-faced boss $n'$ which engages a cam-faced boss $o^4$ on the adjacent ear $o^2$, so that as the arm is turned on the bolt as an axis the ear which is engaged by said arm will be moved toward the opposite ear, and the bolt will be drawn longitudinally to thereby draw said opposite ear toward the first named ear. Thus the two ears are caused to approach each other and the two semicircular members $o$, $o$, are caused to engage the case. Movement of the arm $n$ in one direction causes the two semicircular members to engage the case and movement thereof in the opposite direction permits said members to disengage the case. By turning up the nut on the bolt $o^2$ the ears are adjusted relative to each other.

I claim:—

1. A brake-band consisting of two semicircular resilient members having pivotal supports at their lower ends, in engagement with each other, which admit of a relative rocking movement of the members, and having bosses at their lower ends below said pivotal supports, a bolt extended through alined holes in said bosses to connect said members together and rock them on their pivotal supports, thereby to vary their resiliency, and actuating means for said members, substantially as described.

2. A brake-band consisting of two semicircular resilient members having pivotal supports at their lower ends, in engagement with each other, which admit of a relative rocking movement of the members, and having bosses at their lower ends below said pivotal supports with alined holes through them which intersect said pivotal supports, a bolt extended through said holes to connect said members together and rock them on their pivotal supports, thereby to vary their resiliency, and actuating means for said members, substantially as described.

3. A brake-band consisting of two semicircular resilient members in engagement with each other at their lower ends, one of said members having a semicircular rib on its engaging-face and the other member having a semicircular recess on its engaging-face to receive said rib, said members having bosses at their lower ends with alined holes through them, a bolt extended through said holes to connect said members together and to rock them, thereby to vary their resiliency, and actuating means for said members, substantially as described.

In testimony whereof, I have signed my name to this specification, in the presence of two subscribing witnesses.

HENRY A. TUTTLE.

Witnesses:
B. J. NOYES,
H. B. DAVIS.

Copies of this patent may be obtained for five cents each, by addressing the "Commissioner of Patents, Washington, D. C."